Figure 3:
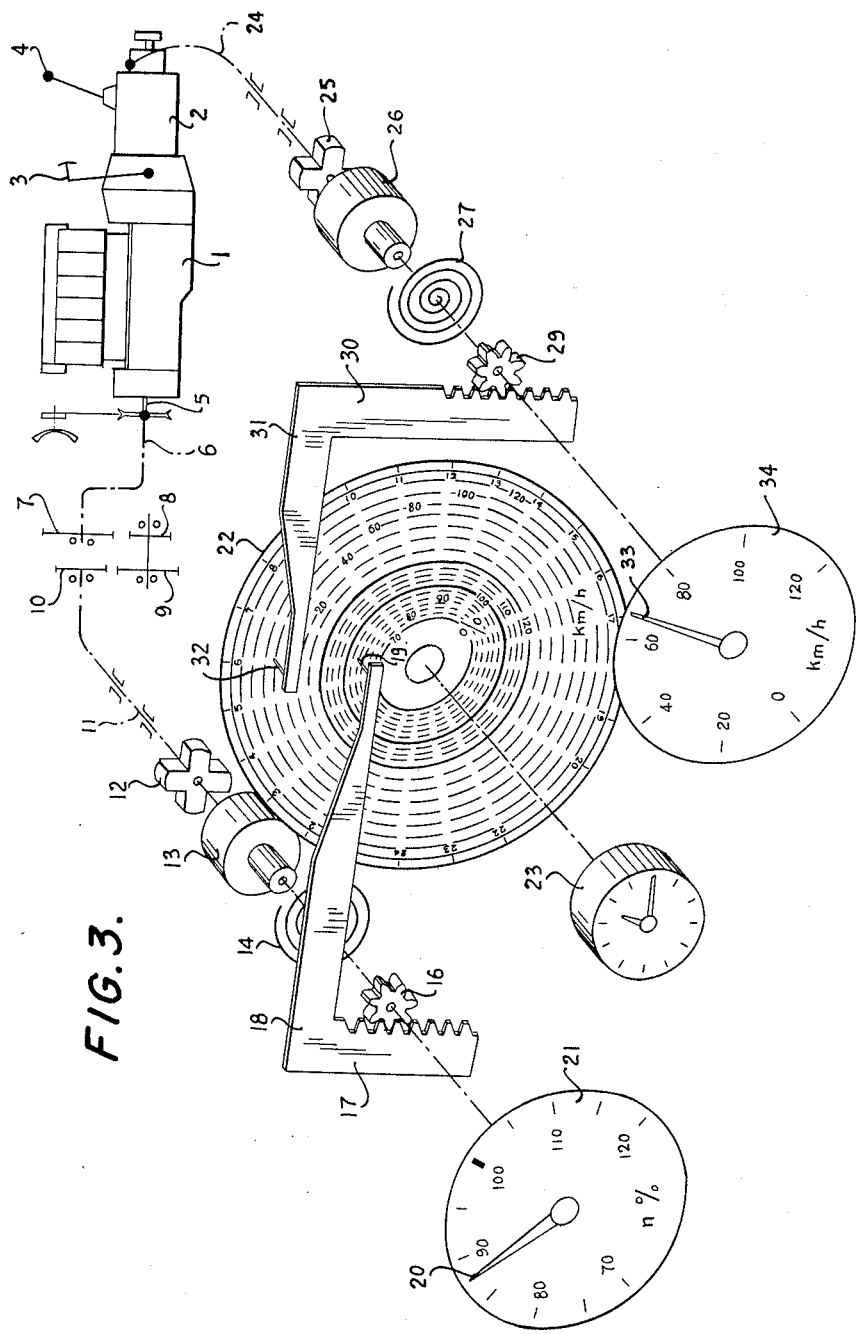

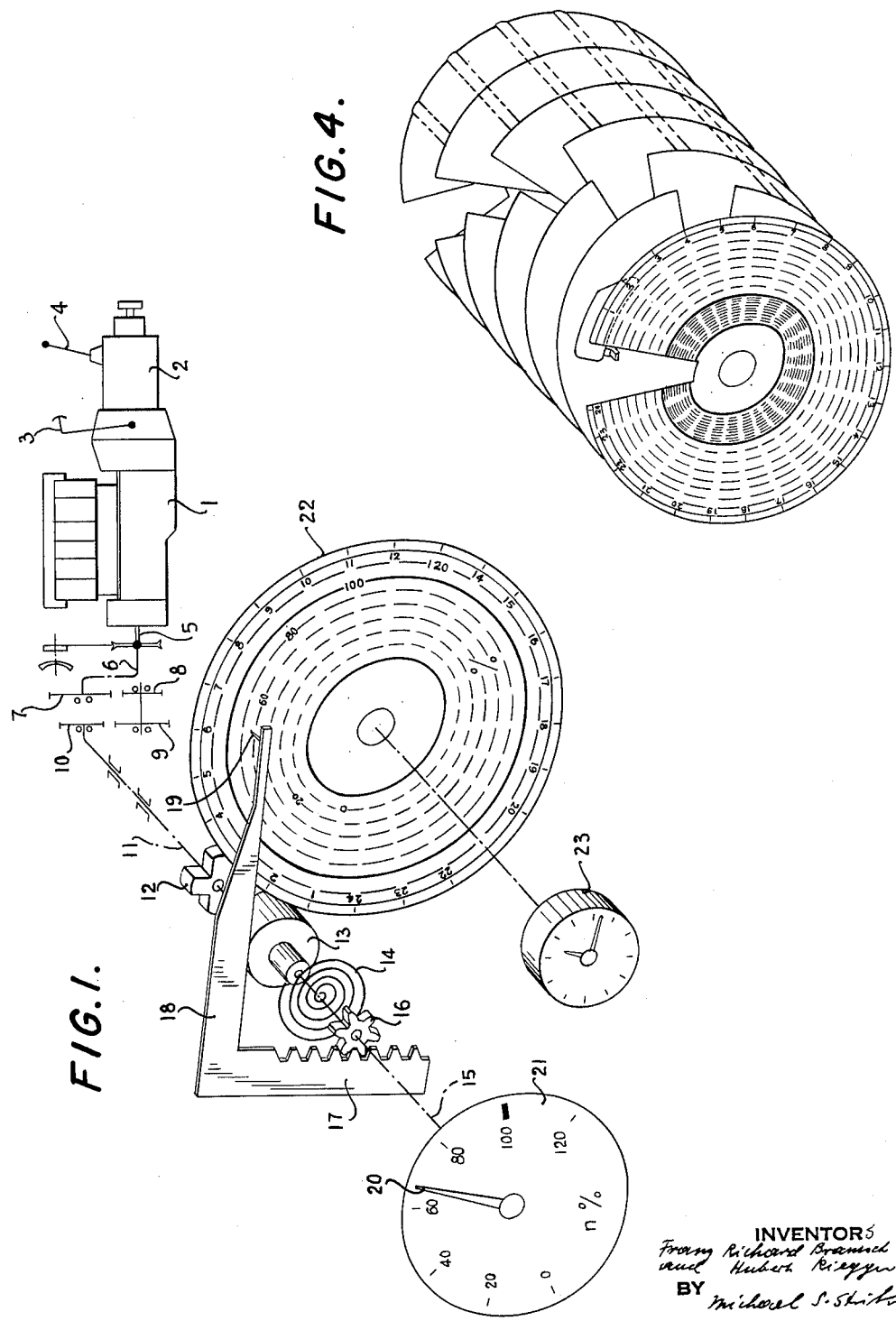

Oct. 19, 1965    F. R. BRAMSCH ETAL    3,213,459
APPARATUS FOR INDICATING THE OPERATION OF A MOTOR
Filed July 30, 1963    4 Sheets-Sheet 2

INVENTORS
Franz Richard Bramsch
and Richard Rieger
BY
Michael S. Striker
ATTORNEY Oct. 19, 1965  F. R. BRAMSCH ETAL  3,213,459
APPARATUS FOR INDICATING THE OPERATION OF A MOTOR
Filed July 30, 1963  4 Sheets-Sheet 3

INVENTORS
Friedrich Richard Bramsch
and Hubert Rieger
BY
Michael S. Striker
ATTORNEY

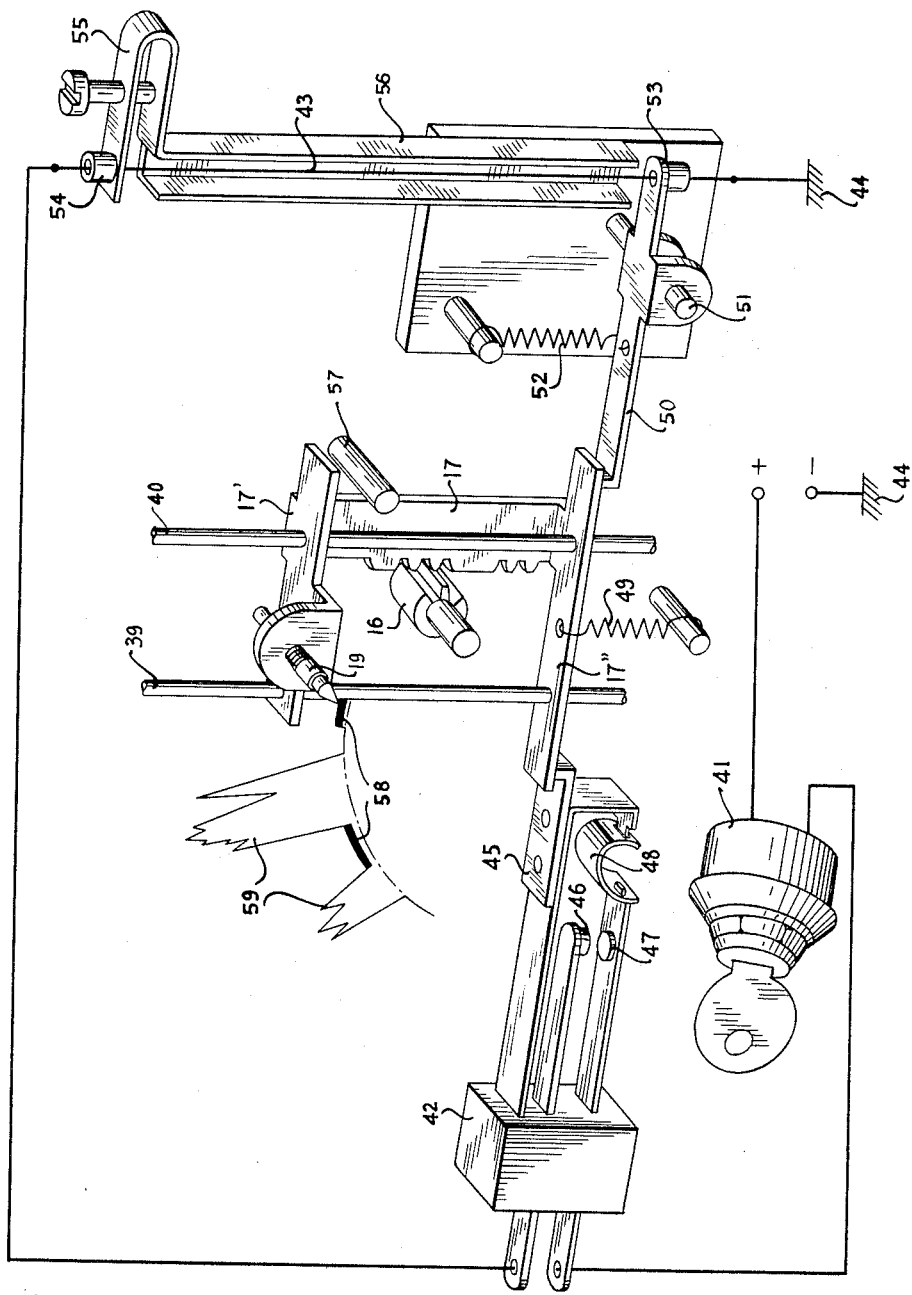

United States Patent Office 3,213,459
Patented Oct. 19, 1965

3,213,459
APPARATUS FOR INDICATING THE OPERATION OF A MOTOR
Franz Richard Bramsch and Hubert Riegger, Johannesburg, Transvaal, Republic of South Africa, assignors, by mesne assignments, to Kienzle Apparate G.m.b.H., Villingen im Black Forest, Germany
Filed July 30, 1963, Ser. No. 298,608
6 Claims. (Cl. 346—18)

The present invention relates to devices for indicating and/or recording operating characteristics of motors.

For example, it is known to provide vehicles such as trucks, buses, and the like with instruments which will record the speed of travel of the vehicle as well as the speed of operation of the engine thereof, and also indications of the speed of travel and speed of operation of the engine are provided for the operator.

All devices of this type require, in order to provide a continuous indication and recording of the speed of travel of the vehicle, for example, a minimum stroke of a recording instrument and a minimum advance of a recording sheet on which an inscription is made by the recording instrument, so that it will be possible later on to provide an intelligent evaluation of the inscription which is made by the device. This requirement necessitates a diagram disc of a certain minimum diameter or a recording strip of a certain minimum width. Moreover, in order to record the speed of revolution of an engine, additional recording space is required, and it has been customary heretofore to record speed of travel on one side of a disc and speed of the engine on the other side thereof, and both sides of the elongated recording band have also been used for these purposes. Inasmuch as the range of operating speeds of different engines can be widely different and can vary, for example, between an idling speed of approximately 350 revolutions per minute and a maximum speed of approximately 7,000 revolutions per minute, the scales of indicating dials and the areas of recording sheets have been divided into several different measuring areas. This requirement has created great difficulties in manufacture and repair of these devices, and furthermore, as was pointed out above, where it is required to provide recordings on both sides of a recording sheet, such as a disc, it is necessary to coat both sides with wax, so that such recording sheets are relatively expensive and make it extremely difficult to coordinate the indications on the opposite sides of the sheet without the use of auxiliary devices which are quite complicated and without the use of highly qualified experts. Moreover, where it is necessary to provide recordings on both sides of the sheet it is not possible to use 7-day recording devices in which a stack of seven disks connected to each other in a special way are provided to provide consecutive recordings throughout a period of seven days. With such a stack it is not possible to provide recordings on both sides of each recording sheet.

In the event that it is desired to maintain the normal size of a device of the above type and still to use 7- or 8-day recording stacks, while recording both the speed of travel and the speed of revolution of the engine on a single side of a recording sheet, then it is necessary either to be satisfied with an insufficient area for the recordings, which greatly detracts from the evaluation of the recordings, or it is necessary to provide a relatively large number of different recording discs for the different ranges of speeds, and it is necessary to use a plurality of different recording devices to record the different measuring ranges, and these devices are not interchangeable. Thus, it becomes completely uneconomical to resort to such expedients and in addition the evaluation of the recordings under such conditions is extremely difficult inasmuch as the vehicles are provided with widely different engines so that the person who is making the evaluations must always take into consideration the particular characteristics of the particular engine when evaluating a particular recording.

It is a primary object of the present invention to provide a device of the above type which overcomes all of the above drawbacks.

In particular, it is an object of the invention to provide a device capable of indicating as well as recording an operating characteristic of a motor, the device being of universal applicability in that it can be used with the motors of widely varying characteristics while still providing clear indications and recordings which are easy to evaluate.

It is also an object of the present invention to provide a device of the above type capable of recording on a stack of discs to provide a 7- or 8-day record while at the same time using only a single side of each recording disc for indicating both speed of travel and speed of the engine while in no way detracting from the clarity of the recordings and the ease with which they may be evaluated, and while still enabling the device to be used with motors of the most different characteristics.

It is also an object of the present invention to provide a device of the above type which is particularly suited for indicating critical operating characteristics such as a critical engine speed which can but should not be exceeded.

Also, it is an object of the present invention to provide a device of the above type which can be used with any desired auxiliary devices such as an auxiliary device for indicating when the engine was operated at its idling speed.

A further object of the invention is to provide a device of the above type which is adapted to give a warning signal when certain critical operating ranges are reached as well as to record characteristics of the warning signal.

Also, the objects of the present invention include the provision of a structure capable of accomplishing the above objects and at the same time being relatively simple and inexpensive as well as rugged and reliable in operation.

With these objects in view, the invention includes, in a device for indicating an operating characteristic of a motor, an indicating means for indicating an operating characteristic of a motor, this indicating means including an indicating member capable of moving through a given range of movement. In accordance with the invention there is operatively connected to the indicating means a transmission means which is adapted to be connected to the motor for transmitting a drive from the latter to the indicating means to operate the indicating means, and in accordance with the invention the transmission means has a particular transmission ratio which is adapted to the characteristics of the particular motor so that the indicating member of the indictaing means will be moved through its range of possible movement when connected through the particular transmission means to the particular motor. In this way, by the choice of a suitable transmission means of a suitable transmission ratio it is possible to connect the same indicating structure to motors of widely varying characteristics while always operating the indicating structure from the particular motor in such a way that the full range of movement of the indicating member can be utilized for indicating the operating characteristic of the particular motor.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 diagrammatically indicates one possible embodiment of a structure according to the present invention;

FIG. 2 shows the structure of FIG. 1 used in conjunction with additional structure for giving additional information;

FIG. 2a fragmentarily illustrates the recording disc of FIG. 2, FIG. 2a showing the reverse side of the recording disc which is not visible in FIG. 2;

FIG. 3 shows another embodiment of the structure of FIG. 2, the structure of FIG. 3 providing recordings on the same side of the recording disc, while the structure of FIG. 2 provides recordings on opposite sides of a recording disc;

FIG. 4 diagrammatically illustrates a stack of recording discs; and

FIG. 5 is a diagrammatic illustration of an auxiliary device capable of being used with the structure of the invention.

Referring to FIG. 1, there is shown therein a motor 1 in the form of an engine of a vehicle used to propel the vehicle, the motor or engine 1 driving the vehicle through a suitable gear transmission 2. The accelerator pedal 3 is operatively connected to the motor 1 for controlling the speed of movement of the vehicle in a manner well known in the art, and in addition the transmission 2 has operatively connected thereto the gear-shift lever 4 which is available to the operator for adjusting the transmission ratio of the transmission 2, as is well known in the art.

The crank shaft 5 of the engine 1 drives, through a flexible shaft 6, a transmission 7–10. The flexible or bendable shaft 6, which may be of any suitable construction well known in the art, is connected at its ends respectively to the crank shaft 5 and the gear 7 so as to drive the latter from the crank shaft 5 at the same speed of rotation as the crank shaft 5, and the gear 7 meshes with the gear 8 which is fixed coaxially to the gear 9, the gear 9 meshing with the gear 10, and the transmission 7–10 is in the form of a separate unit in which the gears 7–10 are supported for rotation by suitable bearings. The output gear 10 of the transmission 7–10 is connected with a shaft 11 so as to rotate the latter, and the shaft 11 is connected to the rotary magnet 12 of a speed measuring device, the particular device illustrated measuring the speed according to an eddy current system. In a manner well known in the art, the rotary magnet 12 rotates within a hollow cup or cylinder 13 which is coaxial with but freely rotatable with respect to the magnet 12, and because of the magnetic field the member 12 during its rotation tends to turn the cup 13 with the member 12. However, a spiral spring 14 is operatively connected to the cup 13 to urge it to a given rest position, and the rotary magnet 12 turns the cup 13 in opposition to the spring 14 as a result of the magnet field. The cup 13 turns through a given angle which will depend upon the speed of rotation of the magnet 12, as is well known in the art, and when the force with which the rotating magnet 12 tends to turn the cup 13 in one direction is exactly opposed by the return force of the spring 14, the cup 13 will remain at an angular position which is indicative of the speed of rotation of the magnet 12, and as the speed of rotation of the latter changes the angular position of the cup 13 changes, so that in this way the angular position of the cup 13 gives an accurate indication of the speed of rotation of the magnet 12. The cup 13 is coaxially fixed with a pinion 16 which meshes with a rack 17 guided by any suitable structure for vertical movement, as viewed in FIG. 1, so that with this arrangement the elevation of the rack 17 will be indicative of the speed of rotation of the shaft 11. The rack 17 fixedly carries an arm 18, which may be integral with the rack 17, and at its free end the arm 18 carries a writing instrument 19 which is adapted to make inscriptions on a recording sheet which in the illustrated example takes the form of the disc 22. The pointer 20 of an indicating dial is also fixed to the cup 13 for turning movement therewith. Thus, the cup 13, the pinion 16, and the pointer 20 may all be fixedly carried by a common shaft 15 supported for rotary movement by any suitable bearings, and thus the angular position of the pointer 20 will also be indicative of the speed of rotation of the shaft 11, and the pointer 20 cooperates with a scale 21 carrying graduations which are described below. The recording disc 22 is connected in a known way with a clockwork 23 which rotates the disc 22 at a uniform speed which depends upon the passage of time.

One of the most important parts of the invention resides in the transmission means 7–10. The means for indicating and recording the speed of the motor 1 includes indicating members 20 and 19 which are capable of moving through a given range. By proper choice of a suitable transmission means 7–10, it is possible to provide between the motor 1 and the shaft 11 a transmission ratio which will guarantee that the indicating members 20 and 19 move through the entire range of possible movement for the particular operating characteristics of the engine 1. Thus, while using the same indicating means it is possible by choice of a transmission means 7–10 of a suitable transmission ratio to guarantee that for the particular motor 1 the indicating means will be capable of moving its indicating members throughout their entire range of movement. Moreover, where the operating characteristic has a critical value such as a relatively high speed of the engine which should not be exceeded, although it can be exceeded, it is possible by proper choice of the transmission means 7–10 to provide an arrangement where the indicating members 19 and 20 will always have the same position for the critical value of the operating characteristic of the particular motor. For example, the relatively high operating speed of different engines which should not be exceeded, although they can be exceeded, may have widely different values, and by proper choice of a particular transmission means to go with a particular engine, there can always be provided for a particular engine a transmission ratio at the transmission means 7–10 which will guarantee that the indicating members 19 and 20 will be at the same position for the critical operating speed. It will be noted that the disc 22 of FIG. 1 as well as the scale 21 include a relatively heavy graduation or circle, this circle of the disc 22 bearing the graduation 100 and the graduation 100 of the scale 21 also being indicated heavier than the other graduations, and these particular points on the disc 22 and the scale 21 represent the critical value of the particular operating characteristic which can but should not be exceeded.

The possibility of using interchangeable transmissions 7–10 of widely different transmission ratios enables the same indicating and recording structure to be used with widely different engines, while still taking full advantage of the entire operating range of the particular indicating and recording structure and while even using the same indications for the critical operating values of the widely different engines, as was pointed out above. For example, there may be a motor A which should not be operated at a speed above 2400 r.p.m., while a motor B should not be operated at aspeed above 4000 r.p.m., and a third motor C should not be operated at a speed above 7200 r.p.m. By using with these different engines different transmissions 7–10 of different transmission ratios, it is possible to drive through these transmissions identical indicating and recording devices where the pointer and writing instrument will move through the same range for each engine and will have the same position for each of the critical speeds which should not be exceeded, so that the best possible use is made in each case of the available area for indicating and recording the operating characteristics of the particular motor. In this way it is possible to provide very clear indications and recordings which can be easily evaluated, although the particular engines may have widely different characteristics, and the operations at the critical value as well as through a considerable range beneath the critical value are easily visible and evaluated, so that the operator of the vehicle can efficiently control it and also an efficient evaluation may be made of the recordings.

For many purposes it may be suitable simply to provide the operator with an indication of when he is operating dangerously in the range of the critical speed of the engine. However, it is of considerable value to the operator also to know how the engine is operating at values beneath its critical speed, and for this purpose the scale 21 is provided with the several graduations less than 100 which are shown in FIG. 1, and of course the disc 22 is also provided with corresponding circles so that the recorded information can be acurately evaluated.

It is to be noted that the graduations of the scale 21 and the numerical values applied to the circles of the disc 22 are percentages. Thus, the indicating structure of the invention does not indicate specific operating speeds. With the structure of the invention the critical operating speed which can but should not be exceeded is considered as being equal to 100%, and all of the indications and recordings are in the form of percentages of this critical operating value. Of course, there are also indications of when the critical operating speed is exceeded, and thus it will be noted that the scale 21 includes a graduation indicating 120% while the disc 22 also includes a circle bearing the graduation 120, so that the operator knows when he is exceeding the critical speed and also a recording of such operation is made. Because the indications and recordings are in percentages, it is possible to use the very same dials and recording discs with motors of widely different characteristics, and in each case, by choice of a suitable transmission 7–10, the indicating members 20 and 19 of the indicating means will move through the same range giving information in the form of percentages of the critical operating value which is equal to 100%.

The fact that the indications and recordings are made in percentages with no indication of specific operating values is of no difficulty whatsoever since the operator knows the critical operating speed which should not be exceeded and therefore can very easily determine what the particular actual engine speed is, and of course the same applies to the evaluation of the recordings made on the disc 22. The operator of the vehicle actually is required only to know the relative value of the particular operating speed to the critical operating speed, and such a relative value is immediately apparent from the dial 21, so that from this dial the operator can easily know whether or not the engine is operating in a proper range, and in fact the indications are easier to evaluate than specific actual operating speeds.

Of course, the device of the invention is not necessarily limited to use with an indicating means which includes a magnetic speed indicating device operating on the eddy current principle. It is also possible to use a speed indicating device which employs centrifugal weights in a manner well known in the art, and such a device also can be used for moving a pointer of a dial and a recording instrument. Moreover, the transmission 7–10 of the invention need not be in the specific form illustrated and can, for example, be in the form of a worm and worm wheel drive, or any other suitable transmission providing the desired transmission ratio may be used. Also, instead of using a rotary recording disc 22, it is possible to use a linearly movable recording band or strip, although the rotary recording disc is by far the most preferable from a practical standpoint.

FIGS. 2, 2a and 3 show two different embodiments of the invention in which the indication and recording of engine speed is combined with the indication and recording of the vehicle speed. With the embodiment of FIGS. 2 and 2a, the different recordings are made on opposite sides of a single disc, while in the embodiment of FIG. 3 both of the recordings are inscribed on the same side of a disc.

In the embodiments of FIGS. 2 and 3, the structure for indicating and recording the engine speed is substantially identical with that of FIG. 1. With the embodiment of FIG. 2, however, the speed indicating structure is regulated so that an intermediate part of the speed indications provided and recorded with the embodiment of FIG. 1 are suppressed with the embodiment of FIG. 2. Such an adjustment may be made by suitable adjustment of the spring of the magnetic speed-measuring system. For example, instead of a single spring 14, it is possible to provide a pair of spiral springs one of which works against the other and which may be adjusted in such a way that a selected part of the speed indication and recording can be suppressed. Thus, as may be seen from FIG. 2, the scale 21 illustrated therein will not provide any speed indications in the range from 20 to 60 percent of the critical speed which is equal to 100%. Thus, with the embodiment of FIG. 2 the pointer 20 will indicate only engine speeds which are less than 20% of the critical speed and which range from between 60 and 115% of the critical speed which is equal to 100%, as indicated above. With this construction as the speed increases up to 20% of the critical speed the pointer 20 will approach the 20% mark, and as long the the speed is between 20 and 60% of the critical speed the pointer will remain stationary at the 20/60% mark, the pointer moving beyond this mark only when the speed moves above 60% of the critical speed. In the same way it will be noted from FIG. 2a, which shows the reverse side of the disc 22 of FIG. 2, that the writing instrument 19, which inscribes the disc 22 on its reverse side, as viewed in FIG. 2, will make the inscription on circles where the range from 20 to 60% of the critical speed is also suppressed, and the pointer 19 also will remain on the 20/60 circle as long as the speed is between 20 and 60% of the critical speed. Only when the speed moves above 60% of the critical speed will the pin 19 move beyond the circle, and of course it will also move in the other direction beyond the circle when the speed falls below 20% of the critical speed. It will be noted from FIG. 2a that the 100% circle, which represents the maximum permissible speed which can but should not be exceeded, and which is referred to herein as the critical speed, is indicated by a heavy line, as compared to the other circles.

The indication and recording of upper and lower engine speed ranges is desirable in order to determine whether or not the engine is accelerated to an excessively great or an excessively small extent. Moreover, with such an arrangement it is possible to indicate the idling of the engine.

With the embodiment of FIG. 2 the speed of travel is recorded on the front of the disc 22. For this purpose, a drive is taken from the change-gear unit 2 of the vehicle, and thus it will be seen from FIG. 2 that the shaft 24 is driven from the output of the unit 2 and drives a rotary magnet 25 of a magnetic eddy current system which includes also the hollow cup or cylinder 26 which tends to be dragged along with the rotary magnet 25 in opposition to the spring 27, precisely as described above in connection with the engine speed measuring device of FIG. 1. The cup 26 is carried by a rotary shaft 28 which, in addition to being connected to the spring 27, is fixed with a pinion 29 meshing with a rack 30 having a lateral arm 31 carrying the pen 32 which inscribes the front face of the disc 22. Moreover, the shaft 28 is fixed to a pointer 33 which moves over a scale 34 of vehicle speeds.

The embodiment of the invention which is illustrated in FIG. 3 records the speed of the engine on the same side of the disc as the vehicle speed. With the embodiment of FIG. 3 there is no suppression of an intermediate engine speed range, but instead the entire lower speed range all the way up to 70% of the critical speed is suppressed, so that the scale 21 and the disc 22 will respectively indicate and record engine speeds ranging from 70 to 120% of the maximum permissible or critical speed which is equal to 100%. This result is brought about by providing a pretension in the spring 14 which will prevent any speed indications from being given on the dial 21 or recording on the disc 22 until the engine speed exceeds 70% of the maximum permissible or critical speed. It will be noted that the inner part of the disc 22 is provided with circles giving recordings from 70 to 120%, with the 100% circle being heavier than the others. As a result of the suppression of the lower speed range with the embodiment of FIG. 3, there will remain on the disc 22, which does not have to have its diameter enlarged, a sufficient area to provide not only a clear and easily evaluated recording of the engine speed but also a clear and easily evaluated recording of the vehicle speed. Thus, with this arrangement it becomes unnecessary to make inscriptions on opposite sides of the same sheet and also it becomes unnecessary to increase the diameter of the sheet. It is to be noted that both with the embodimen of FIG. 2 as well as with that of FIG. 3 the full use of the entire available indicating and recording area is taken advantage of, irrespective of the characteristics of the particular engine by choice of a transmission means 7–10 of a suitable transmission ratio, as explained above, so that with the structure of the invention it is possible to connect the same indicating and recording structure to engines of widely different types and operating characteristics while still making full use of the available indicating and recording areas.

Inasmuch as the inscriptions with the embodiment of FIG. 3 are made on only one side of the recording disc, it is possible with the embodiment of FIG. 3 to use the 7 or 8-day devices for indicating engine speed and speed of travel for a 7 or 8-day period. Where inscriptions are made on opposite sides of the same sheet, it is not possible to have an automatic 7 or 8-day recording.

FIG. 4 illustrates in an exploded, diagrammatic view the stack of recording discs which are used for such a purpose, such a stack of recording discs being known per se. It will be seen from FIG. 4 that there are seven recording discs respectively provided with radial notches and respectively stacked against each other while being angularly displaced one with respect to the other by an angular distance equal to the width of a radial notch, so that it is possible to provide continuous inscriptions for a 7 or 8-day period in a manner well known in the art.

In order to be able to use a recording disc of conventional size to indicate both engine speed and vehicle speed, the lower engine speed ranges have been suppressed with the embodiment of FIG. 3 so that the available space can be used for the most important speed ranges. However, it may be desirable to record the idling of the engine, because it is possible from indications of the periods during which the engine is operated at its idling speed to determine how economically the operator of the vehicle runs the vehicle which is entrusted to him. Devices for indicating the time and duration of operation at idling speed may be very easily combined with the structure described above, and FIG. 5 shows one possible embodiment of a structure for this purpose.

Referring to FIG. 5, there is shown therein the pinion 16 which is the pinion 16 of any of the embodiments of FIGS. 1–3 and which is coaxially fixed to the rotary cup of the magnetic engine-speed measuring system, as described above. The pinion 16 meshes with the rack 17 which through the arm 18 is connected to the inscribing pen 19, as described above. As may be seen from FIG. 5, the rack 17 is fixed to a pair of horizontal bars 17' and 17" which are respectively formed with aligned openings through which a pair of vertical rods 39 and 40 extend, so that these rods guide the bar 17 for vertical movement. A spring switch 42 is electrically connected through the ignition switch 41 with the positive pole of the battery of the vehicle, the negative pole of which is grounded, as indicated at 44, and the electrical circuit includes also the wire 43, which is to be heated for a purpose described below, this wire 43 also being grounded as indicated at 44 in FIG. 5, so that the wire 43 is connected to the negative pole of the battery, and thus when the switches 41 and 42 are closed a circuit through wire 43 will be completed. The spring switch 42 has an actuating portion 45 located beneath the bar 17', and the arrangement is such that when the inscribing pen 19 is at its zero position the bar 17" is at a low enough elevation to act on the element 45 for placing the latter at an elevation low enough to cause the tilt-spring 48 to act on the springy arms of the switch 42 for bringing the contacts 46 and 47 thereof into engagement with each other, so that in the zero position of the inscribing pen 19 the switch 42 is closed. A spring 49 is connected to the lower bar 17' to urge the latter downwardly, to a rest or zero position, and this latter position is determined by the engagement of the upper bar 17' with a stationary pin 57. The bar 17" cooperates not only with the element 45 of the switch 42 but also with a lever 50 which is supported for turning movement by a stationary pivot 51 and which is urged to turn in a clockwise direction, as viewed in FIG. 5, by a spring 52. At its right end, as viewed in FIG. 5, the lever 50 is soldered to the end 53 of the wire 43, while the other end 54 of the wire 43 is fixed to a leaf spring 55 which can be adjusted so as to adjust the tension of the wire 43, and the wire 43 extends along the interior of a housing 56.

When the vehicle is stationary with its engine turned off, the rack 17 is in the position determined by engagement of the bar 17' with the stop member 57, and in this case the bar 17" closes the switch 42 by maintaining the contacts 46 and 47 thereof in engagement with each other. Inasmuch as the ignition switch 41 is not closed, no current flows through the wire 43. The wire 43 is so short that it will maintain the lever 50 in a position displaced in a counterclockwise direction, as viewed in FIG. 5, from the rest position which the lever 50 would take if it were permitted to turn until the spring 52 became untensioned. In other words, in the rest position of the parts the spring 52 is tensioned and the wire 43 holds the lever 50 in opposition to the spring 52 in an angular position displaced from the position which the lever 50 would take if the wire 52 were permitted to contract.

If the engine is now started by closing the ignition switch 41, a circuit is completed through the wire 43 which increases in temperature and becomes elongated, which is to say increases in length due to the increase in its temperature and the tension applied to the wire 43 from the spring 52 to the lever 50. As a result of the elongation of the wire 43 the lever 50 can turn in a clockwise direction, as viewed in FIG. 5, and this turning of the lever 50 will raise the bar 17" and thus the inscribing pen 19 will also be raised slightly. The raising of the bar 17", however, provides a simultaneous opening of the switch 42, and now the wire 43 slowly cools and of course contracts so that it turns the lever 50 again in opposition to the spring 52 in a counterclockwise direction, as viewed in FIG. 5. The spring 49 pulls the rack 17 and the pen 19 down until they again reach their starting position. As a result of this operation there will be provided on the recording disc a relatively heavy mark 58 which provides on the disc an indication of the time when the motor was operated at its idling speed. As soon as the speed of the engine increases, as a result of the starting of the travel of the vehicle, the rack 17 and the bars 17' and 17" therewith will raise as a result of the drive from the pinion 16, driven by the speed-measuring unit 12–14, and now the disc will be provided with engine-speed markings, as shown at 59 in FIG. 5. Thus, it is possible with the structure of FIG. 5 to indicate on the recording disc the times when the engine was started and operated at its idling speed.

Of course, it is possible to combine with the structure of FIGS. 1–3 any other suitable structure for recording the times when the engine is operated at its idling speed. Thus, if desired, the spiral spring of the magnetic speed-measuring structure can be so adjusted and have such a construction that the engine speed in the range of the idling speed thereof will be fully recorded, but a suppression of a speed range, for example, from 5 to 60% of the maximum permissible or critical speed can be provided, and only speed indications above 60% and below 5% will be provided, so that with such a simple arrangement also the idling speed operation will be recorded for future evaluation.

Inasmuch as the pointer 20 or the writing pen 19 will always be at the same position when the maximum permissible or critical speed which is equal to 100% is attained, it is a simple matter to operate from an element such as the pointer 20 a suitable optical or acoustic warning device which is energized as soon as the pointer 20 moves beyond the 100% mark, for example, and also, it is possible to provide an additional recording device which is actuated by the warning device to record the type, time, and duration of the signal on the disc 22.

It will be understood that each of the elements described above, or two or more together, may also find a useful application in other types of recording and indicating devices differing from the types described above.

While the invention has been illustrated and described as embodied in recording and indicating devices for motors, it is not intended to be limited to the details shown, since various modifications and structural changes may be made without departing in any way from the spirit of the present invention.

What is claimed as new and desired to be secured by Letters Patent is:

1. In an apparatus for indicating engine speed, in combination, indicating means for indicating the speed of revolution of an engine, said indicating means giving indications in percentages of a given relatively high speed which is equal to 100% and said indicating means having an indicating member capable of indicating speeds in the vicinity of and ranging both above and below said 100% indication; and transmission means operatively connected to said indicating means and adapted to be connected to an engine for transmitting a drive therefrom to the indicating means to operate the latter, said transmission means having a ratio in its transmission which will operate the indicating means to provide an indication of 100% when a given relatively high speed of revolution of the engine is reached, said indicating means suppressing a given range of the operating speed of the engine so that the range of movement of the indicating means can be used for the remainder of the speed of operation of the engine.

2. In an apparatus for indicating engine speed, in combination, indicating means for indicating the speed of revolution of an engine, said indicating means giving indications in percentages of a given relatively high speed which is equal to 100% and said indicating means having an indicating member capable of indicating speeds in the vicinity of and ranging both above and below said 100% indication; and transmission means operatively connected to said indicating means and adapted to be connected to an engine for transmitting a drive therefrom to the indicating means to operate the latter, said transmission means having a ratio in its transmission which will operate the indicating means to provide an indication of 100% when a given relatively high speed of revolution of the engine is reached, said indicating means suppressing a given range of the operating speed of the engine so that the range of movement of the indicating means can be used for the remainder of the speed of operation of the engine, the suppressed portion of the range of movement of the indicating means being from 20 to 60% of the speed of the engine which is indicated at 100%.

3. In an apparatus for indicating engine speed, in combination, indicating means for indicating the speed of revolution of an engine, said indicating means giving indications in percentages of a given relatively high speed which is equal to 100% and said indicating means having an indicating member capable of indicating speeds in the vicinity of and ranging both above and below said 100% indication; and transmission means operatively connected to said indicating means and adapted to be connected to an engine for transmitting a drive therefrom to the indicating means to operate the latter, said transmission means having a ratio in its transmission which will operate the indicating means to provide an indication of 100% when a given relatively high speed of revolution of the engine is reached, said indicating means suppressing a given range of the operating speed of the engine so that the range of movement of the indicating means can be used for the remainder of the speed of operation of the engine, said indicating means suppressing speeds up to 70% of the speed of the engine which is equal to 100% and indicating the speeds from 70 to 120% of the speed which is equal to 100%.

4. In an apparatus for indicating and recording operating characteristics of an engine which propels a vehicle, in combination, first indicating and recording means for indicating and recording the speed of rotation of an engine and second indicating and recording means for indicating and recording the speed of travel of a vehicle propelled by the engine, said second indicating means being operatively connected to the engine to be driven thereby; transmission means operatively connected to said first indicating and recording means and also connected to the engine for transmitting a drive therefrom to said first indicating and recording means for operating the latter, said transmission means having a transmission ratio which will move indicating and recording members of said first indicating and recording means through a given range of movement for the particular characteristics of operation of the particular engine, so that by choice of a suitable transmission means having a suitable transmission ratio it is possible to move the indicating and recording elements of said first indicating recording means throughout a given range irrespective of the characteristics of the engine; and a recording sheet on which the indicating members of both of said indicating and recording means inscribe indication of the engine speed and speed of travel, respectively.

5. In an apparatus for indicating and recording operating characteristics of an engine which propels a vehicle, in combination, first indicating and recording means for indicating and recording the speed of rotation of an engine and second indicating and recording means for indicating and recording the speed of travel of a vehicle propelled by the engine, said second indicating means being operatively connected to the engine to be driven thereby; transmission means operatively connected to said first indicating and recording means and also connected to the engine for transmitting a drive therefrom to said first indicating and recording means for operating the latter, said transmission means having a transmission ratio which will move indicating and recording members of said first indicating and recording means through a given range of movement for the particular characteristics of operation of the particular engine, so that by choice of a suitable transmission means having a suitable transmission ratio it is possible to move the indicating and recording elements of said first indicating recording means throughout a given range irrespective of the characteristics of the engine; and a recording sheet on which the indicating members of both of said indicating and recording means inscribe indication of the engine speed and speed of travel, respectively, said recording members operating on the same side of the recording sheet.

6. In an apparatus for indicating and recording operating characteristics of an engine which propels a vehicle, in combination, first indicating and recording means for indicating and recording the speed of rotation of an engine and second indicating and recording means for indicating and recording the speed of travel of a vehicle propelled by the engine, said second indicating means being operatively connected to the engine to be driven thereby; transmission means operatively connected to said first indicating and recording means and also connected to the engine for transmitting a drive therefrom to said first indicating and recording means for operating the latter, said transmission means having a transmission ratio which will move indicating and recording members of said first indicating and recording means through a given range of movement for the particular characteristics of operation of the particular engine, so that by choice of a suitable transmission means having a suitable transmission ratio it is possible to move the indicating and recording elements of said first indicating recording means throughout a given range irrespective of the characteristics of the engine; and a recording sheet on which the indicating members of both of said indicating and recording means inscribe indication of the engine speed and speed of travel, respectively, said recording members respectively operating on opposite sides of the same sheet.

References Cited by the Examiner

UNITED STATES PATENTS

| | | | |
|---|---|---|---|
| 2,341,118 | 2/44 | Rodanet | 346—18 |
| 2,613,125 | 10/52 | Brown | 346—73 |
| 2,731,839 | 1/56 | Hendry | 346—139 X |
| 2,823,091 | 2/58 | Milster | 346—18 |
| 2,982,594 | 5/61 | Riegger et al. | 346—18 |
| 3,004,818 | 10/61 | Delfs et al. | 346—49 |

LEO SMILOW, *Primary Examiner.*

LEYLAND M. MARTIN, *Examiner.*